UNITED STATES PATENT OFFICE.

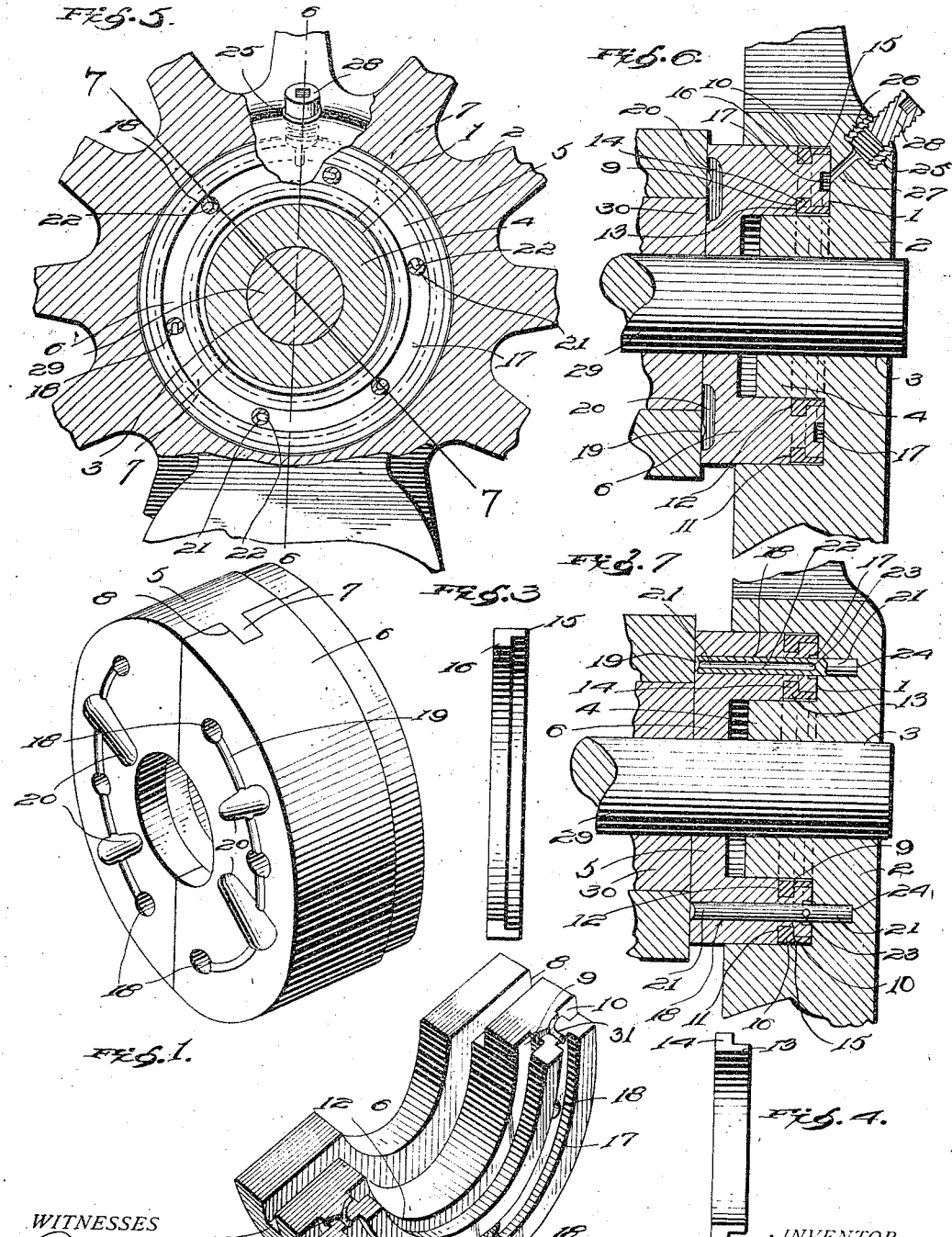

MATTHIAS CHRISTMAN, OF SPRINGFIELD, MISSOURI, ASSIGNOR OF ONE-THIRD TO HARRY L. BISSETT AND ONE-THIRD TO GEORGE A. McLAUGHLIN, OF SPRINGFIELD, MISSOURI.

HUB-PLATE FOR WHEELS.

1,028,677.  Specification of Letters Patent.   Patented June 4, 1912.

Application filed March 25, 1911. Serial No. 616,873.

*To all whom it may concern:*

Be it known that I, MATTHIAS CHRISTMAN, a citizen of the United States, residing at Springfield, in the county of Greene and State of Missouri, have invented certain new and useful Improvements in Hub-Plates for Wheels, of which the following is a specification, reference being had therein to the accompanying drawing.

This invention relates to hub plates and the principal object of the same is to provide a hub plate which will permit lubricant to pass from one side of the hub plate to the other so that the amount of friction will be reduced to the minimum.

This invention is illustrated in the accompanying drawings, wherein:—

Figure 1 is a perspective view of the improved hub plate. Fig. 2 is a perspective view of one of the sections of the hub plate. Fig. 3 is a view of one of the liners which surround the hub plate and hold the sections together. Fig. 4 is a view of one of the liners which is positioned within the hub plate and which assists in holding the sections together. Fig. 5 is a fragmentary view of the hub of the wheel showing the improved hub plate in place. Fig. 6 is a transverse sectional view along the line 6—6 in Fig. 5. Fig. 7 is a transverse sectional view along the line 7—7 in Fig. 5.

This hub plate is intended to be used on the driving wheels, truck wheels and trailer wheels of a locomotive and is seated within an annular recess 1, which is formed in the inner face of the wheel 2 and is spaced from the central opening 3 of the wheel by an annular shoulder 4. This shoulder is reduced so that it is slightly sunk beneath the surface of the inner face of the wheel hub.

The hub plate comprises a pair of sections 5 and 6 each of which is semi-circular. The plates of the sections are held together by means of the tenons 7 which are formed upon the ends of the section 5 and fit within the mortises 8 which are cut in the ends of the section 6. The inner portion of each of the sections is reduced and is provided with the internal groove 9 and with the external groove 10. By having the inner portion of the section reduced the ledges 11 and 12 are formed, upon which the locking liners rest.

The locking liners comprise the inner semi-circular bands 13 each of which is provided with the flange 14 which extends into the groove 9. The outer liners are also formed from semi-circular bands 15 each of which is provided with the flange 16 which fits within the grooves 10. The inner liner is of such dimension that it will fit snugly within the grooves 9, as shown in Fig. 6, and not project beyond the flange 12.

The inner face of the plate is provided with an annular groove 17 and a plurality of openings 18 are formed through the plate. One end of each opening 18 communicates with the groove 17 and the openings are connected at the opposite end of the plate by the grooves 19. Grease pockets 20 are formed in the outer face of the plate and act as reservoirs for grease which passes through the openings 18 and along the grooves 19 to the pockets 20.

A dowel pin 21 is inserted in each of the openings 18 and is provided with a central channel 22 which is provided with an inlet 23 which permits communication with the groove 17. The wheel end portions of the dowel pins are formed solid and extend beyond the inner face of the hub plate and are inserted in sockets 24 formed in the inner end of the recess 1. These pins not only hold the hub plate against independent rotation within the recess, but also act as conduits to permit grease to pass from the groove 17 to the groove 19 and into the pockets 20.

Grease is supplied to the groove 17 by means of a grease cup 25 which is mounted in the hub of the wheel. The grease cup is threaded externally and internally and is threaded into a socket 26 which is formed in the hub of the wheel and which has a reduced extension 27 leading to the recess 1 and positioned so as to communicate with the groove 17. A force plug 28 is threaded into the grease cup 25 and gives a pressure to the grease so that the grease will be given a higher pressure, and, thus, cause the wheel to be better lubricated.

In the operation of this device the plate is inserted in the recess 1 and is held therein by the liner bands 15. The wheel is placed upon the axle 29 and the hub plate rests against the bearing box 30. Grease is poured into the grease cup and the plug 28 is threaded into place so that the grease is forced into the groove 17 and through the dowel pins 21 to the grooves 19 and the pockets 20. The grease is held under pressure by the plug 28 and, therefore, not only has its own lubricating qualities but has the additional lubricating quality given by being under high pressure so that the space between the different parts of the wheel and hub plate are completely filled with oil at all times. It should also be noted that the dowel pins hold the hub plate against independent rotation so that there is no danger of the wheel turning without the plate being also turned. It should also be noted that the ends of the plate sections are provided with the grooves 31 so that grease can pass from the groove 17 to the spaces between the inner faces of the liner bands and plate so as to assist in holding the liner bands against the hub.

What I claim is:—

1. A wheel provided with an annular recess in one face, a hub plate seated within said recess, and common means for securing said plate in said recess and for permitting the passage of lubricating material through said plate.

2. A wheel provided with an annular recess having sockets formed in its inner end, means for admitting grease to said recess, a hub plate mounted within said recess and provided with openings formed therethrough and registering with said sockets, and pins passing through said openings in said plate and into said sockets to hold said plate in place and being also provided with openings to permit a lubricant to pass through said plate.

3. A wheel provided with an annular recess, a hub plate mounted within said recess, the inner face of said hub plate being provided with an annular groove, said plate being provided with a plurality of openings, the outer face of said plate being provided with a plurality of pockets and with grooves connecting said pockets with said openings, and a grease cup positioned within said wheel and communicating with said annular grooves formed in said plate.

4. A wheel provided with an annular recess, a hub plate mounted in said recess, a lubricant holder mounted in said wheel and communicating with said annular recess, means for permitting the passage of a lubricant through said hub plate, the outer face of said hub plate being provided with pockets and with grooves leading to said pockets, and means for retaining said hub plate within said recess.

5. A wheel provided with an annular recess and with a plurality of sockets formed in the inner end of said recess, a hub plate positioned within said recess and provided with a plurality of openings registering with said sockets, and hollow dowel pins passing through said openings in said plate and into said sockets to hold said plate in position, and to form conduits to permit the passage of a lubricant through said plate.

6. A wheel provided with an annular recess, a hub plate mounted within said recess, said hub plate formed of a plurality of sections, means for locking said sections together, and common means for preventing the rotation of said plate within said recess and for permitting the passage of a lubricant through said plate.

7. A hub plate, and means passing through said hub plate for securing said hub plate in a hub to prevent independent rotation of said hub and plate and for permitting the passage of lubricant through said hub plate.

8. A hub plate provided with openings, and means passing through said openings for holding said hub plate in a hub and for permitting the passage of lubricating material through said plate.

9. A hub plate provided with openings, and securing pins for preventing independent rotation of said hub and plate passing through said openings and provided with longitudinally extending openings to permit the passage of lubricating material through said hub plate.

10. A hub plate provided with openings, one face of said hub plate being provided with recesses, and with grooves connecting said recesses with said openings, and securing pins passing through said openings and provided with openings adapted to permit the passage of lubricating material through said hub plate.

11. A hub plate formed from a plurality of sections, means for holding said sections together, and means for holding said hub plate in position and for permitting the passage of lubricating material through said hub plate.

12. A hub plate, and common means for retaining said hub plate in a hub and for permitting the passage of lubricant through said hub plate.

In testimony whereof I hereunto affix my signature in presence of two witnesses.

MATTHIAS CHRISTMAN.

Witnesses:
WM. H. HORINE,
F. W. WRIGHT.